(12) United States Patent  
Carlsen et al.

(10) Patent No.: US 9,827,731 B1
(45) Date of Patent: Nov. 28, 2017

(54) CLIPPER CLOSURE FOR FILTER BELTS

(71) Applicant: National Filter Media, Inc., Winthrop, ME (US)

(72) Inventors: Randy D. Carlsen, Winthrop, ME (US); Rick Gallo, Winthrop, ME (US); Raymond Philippon, Winthrop, ME (US); Alex Burnham, Monmouth, ME (US)

(73) Assignee: National Filter Media, Inc., Winthrop, ME (US)

( * ) Notice: Subject to any disclaimer, the term of this patent is extended or adjusted under 35 U.S.C. 154(b) by 968 days.

(21) Appl. No.: 13/928,718

(22) Filed: Jun. 27, 2013

Related U.S. Application Data

(60) Provisional application No. 61/665,374, filed on Jun. 28, 2012.

(51) Int. Cl.
*B30B 15/00* (2006.01)

(52) U.S. Cl.
CPC .................... *B30B 15/00* (2013.01)

(58) Field of Classification Search
CPC ............................. F16G 3/04; Y10T 24/1636
USPC ............ 24/33 C, 33 P, 31 R, 39, 31 H, 31 W
See application file for complete search history.

(56) References Cited

U.S. PATENT DOCUMENTS

| 2,462,316 | A | * | 2/1949 | Goodloe | F16F 1/362 140/71 C |
| 4,344,209 | A | * | 8/1982 | Harwood | F16G 3/02 139/383 A |
| 4,476,902 | A | * | 10/1984 | Westhead | D21F 1/0054 139/383 AA |
| 5,669,115 | A | * | 9/1997 | Sulzle | F16G 3/04 24/33 B |
| 6,627,045 | B2 | * | 9/2003 | Raczkowski | B31F 1/2877 156/304.4 |
| 2004/0143937 | A1 | * | 7/2004 | Allen | D21F 1/0054 16/373 |

* cited by examiner

*Primary Examiner* — Robert J Sandy
*Assistant Examiner* — Rowland Do
(74) *Attorney, Agent, or Firm* — Patricia Mathers; Jeffrey Joyce

(57) ABSTRACT

A clipper closure assembly for securing ends of an endless loop of fabric. The clipper closure assembly uses a clipper closure and a wire mesh guard or reinforcement, which fit over the end of the fabric. The closure and guard are pressed together and the barbs at the ends of the clipper closure legs bite into the wire mesh guard and the fabric. Two ends fitted with the clipper closure and mesh guard are brought together and a lock bar inserted into the loops that extends from the respective closures. A protective coating may be applied over the clipper closure and mesh guard.

2 Claims, 3 Drawing Sheets

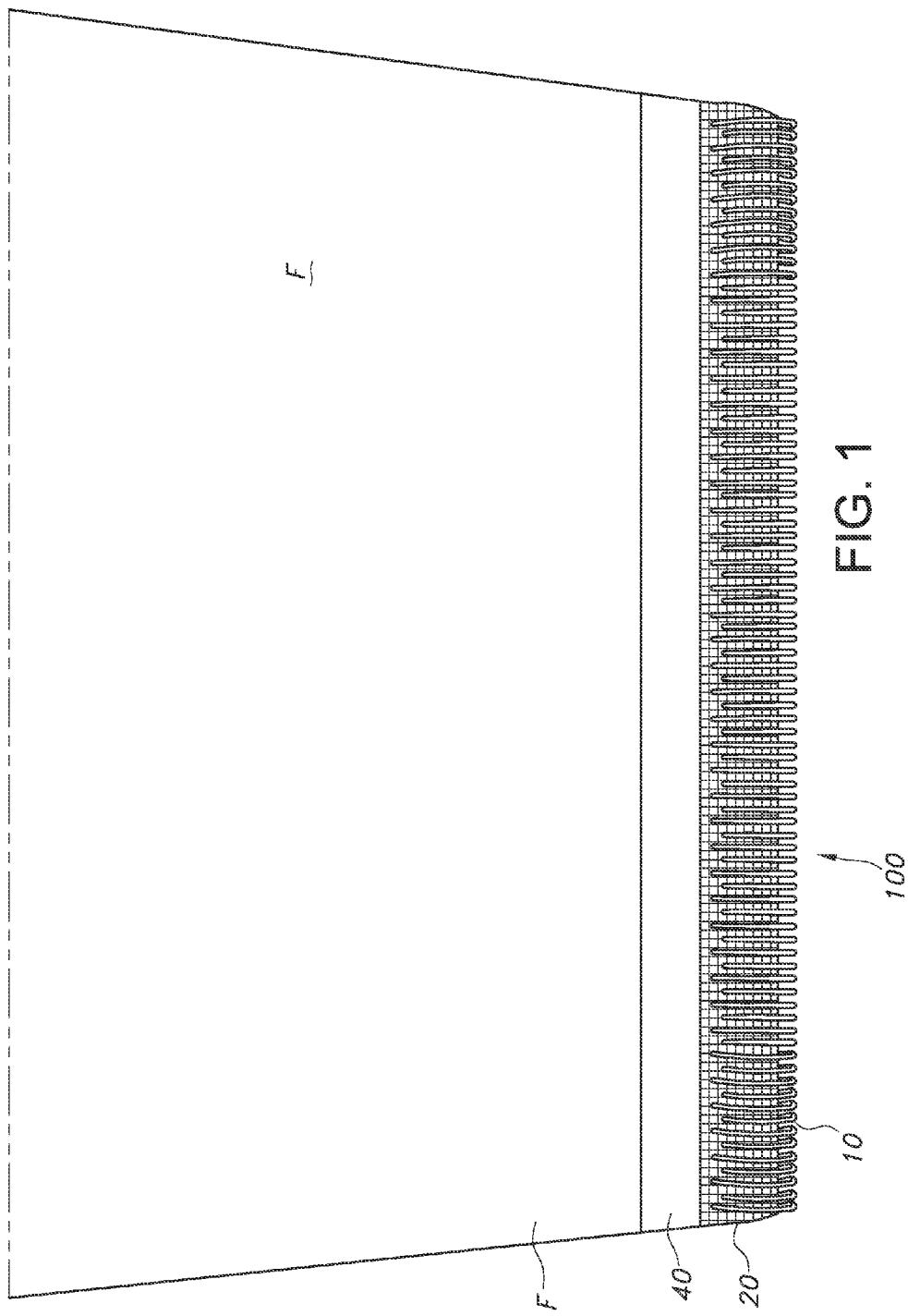

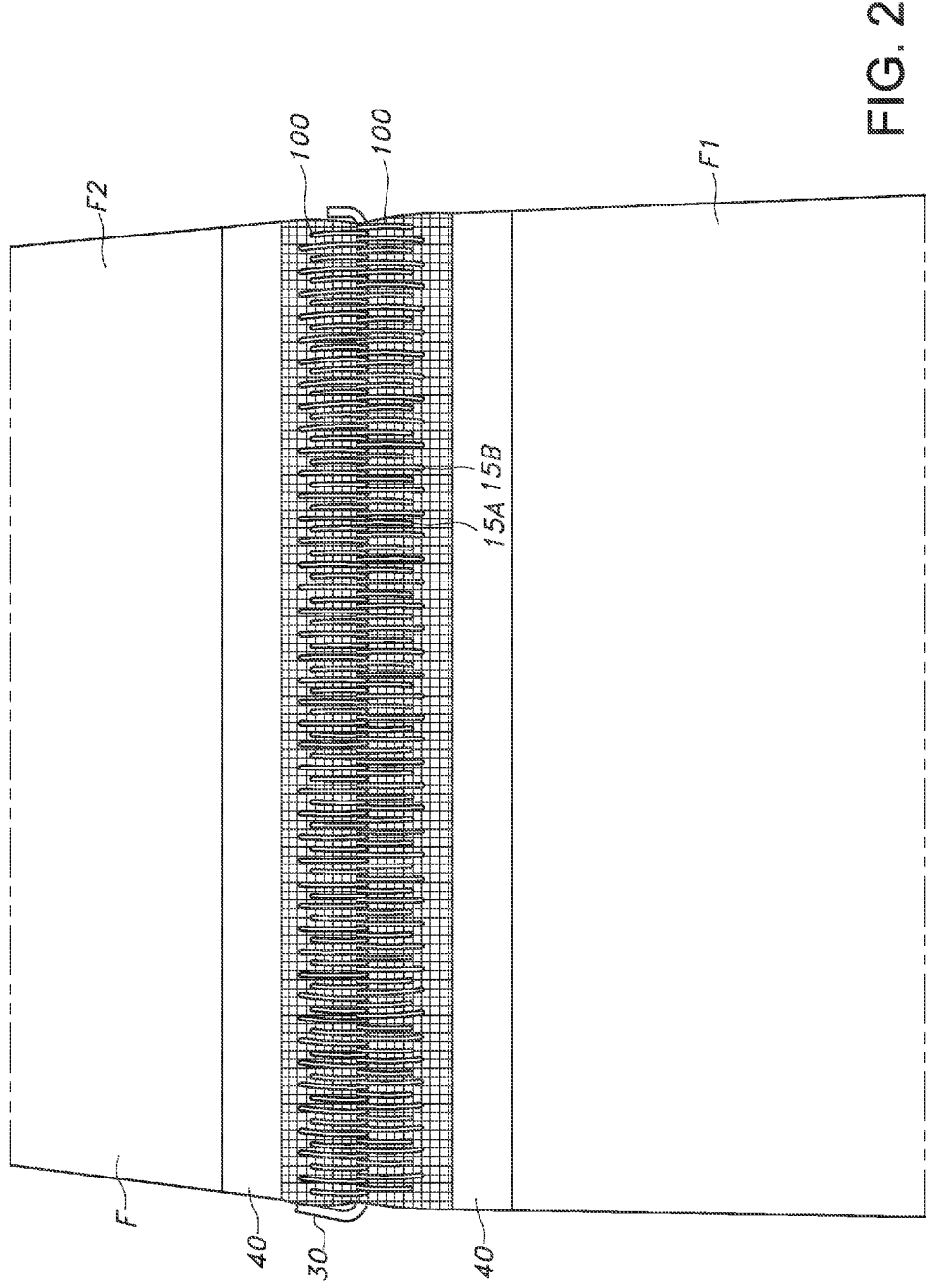

CLIPPER CLOSURE FOR FILTER BELTS

BACKGROUND INFORMATION

Field of the Invention

The invention relates to the field of filter media in industrial applications. More particularly, the invention relates to an improved clipper closure for a filter belt press.

Discussion of the Prior Art

The prior art teaches the use of an endless belt for a filter press. The ends of the belt are fastened together with a so-called clipper closure that interlocks the two ends of the belt to form the endless belt. The clipper closure is provided as a series of clips that are fastened to a bar that extends across the series of clips, so as to hold the individual clips in an evenly spaced orientation. The end of each individual clip has a sharp tooth or barb that is constructed to bite into the filter media or cloth. The clipper closure is typically provided into a V-shape, to facilitate placing it over the end of the filter media. The legs of the clips are then pressed closed over the end of the belt. The belt ends are then brought together so that the outer rounded end of one clipper closure that extends slightly beyond the end of the fabric fits between the outer rounded end of the second clipper closure. A rod or lock bar is inserted through the aligned rounded ends, locking the clipper closures into place and thereby securing the two ends of fabric to one another.

The filter media is a woven cloth and, with time, the clipper closures cause wear and tear on the fabric. As a result, the fabric twists, wrinkles, or "smiles," i.e., the clipper closure acquires a slightly U-shaped bend to it. The extra movement or slack in the belt reduces the effectiveness of the system and eventually leads to complete clipper closure failure, in which the closure rips away from the fabric. This results in time-consuming and costly repair or replacement of the belt.

What is needed, therefore, is a means of securing the ends of the filter belt that provides the desired ruggedness and reliability of the connection, yet prevents the closure from causing wear on the filter media and tearing away.

BRIEF SUMMARY OF THE INVENTION

The invention is a clipper closure assembly that provides a rugged, reliable closure of two belt ends of a belt for use on an industrial filter belt press. The clipper closure assembly according to the invention uses a conventional clipper closure and a wire mesh reinforcement or guard. The wire mesh guard is placed over the end of the fabric before the clipper closure is applied. One side of the guard is shorter than the other. When clamped about the end of the belt, the clipper closure bites through the mesh guard into the belt fabric on the one side and bites directly into the fabric on the other side. The ends of the belt are then coupled together in the conventional manner, by inserting a rod or lock bar through the alternatingly aligned rounded ends of the two clipper closures. Once assembled, a liquid adhesive is applied over the legs of the clipper closure and the mesh guard.

The wire mesh guard stabilizes the clipper closure by significantly reducing the amount of wrinkling, twisting, and "smiling" of the belt fabric, thereby reducing stress and strain that is exerted on the fabric. As a result, the clipper closure does not tear away from the fabric under normal wear and tear, greatly reducing downtime and costs related to repairing or replacing belts.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 1 is an illustration of the clipper closure assembly according to the invention.

FIG. 2 illustrates the clipper closure assembly according to the invention, showing two ends of a belt coupled together.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1 and 2 illustrate a clipper closure assembly 100 according to the invention, assembled on a filter media or fabric F. The filter media F is typically a woven fabric that is used as an endless belt in a filter belt press application for de-watering solids. Reference may be made to a filter belt press when describing the use of the clipper closure assembly according to the invention, but it is understood that such reference is only for purposes of illustration and is not limiting, i.e., that the clipper closure assembly 100 disclosed herein is an assembly and a method of coupling a fabric together, but the fabric may also be used for other applications. FIG. 1 shows a piece of filter media with the clipper closure assembly assembled 10 on it and FIG. 2 shows two ends of a fabric F that have been coupled together to form an endless belt.

Figure 4:
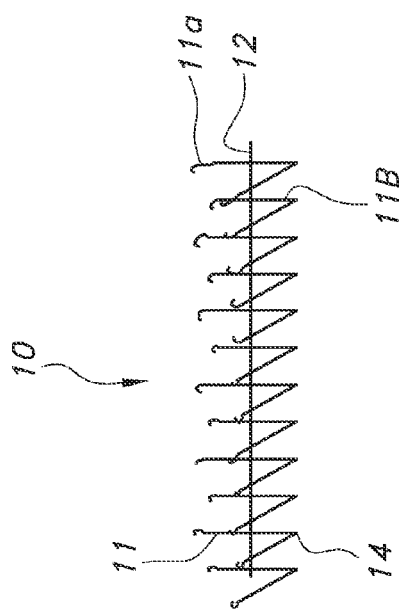
FIG. 4 is a plan front view of the clipper closure of FIG. 1 (prior art).
Figure 3:
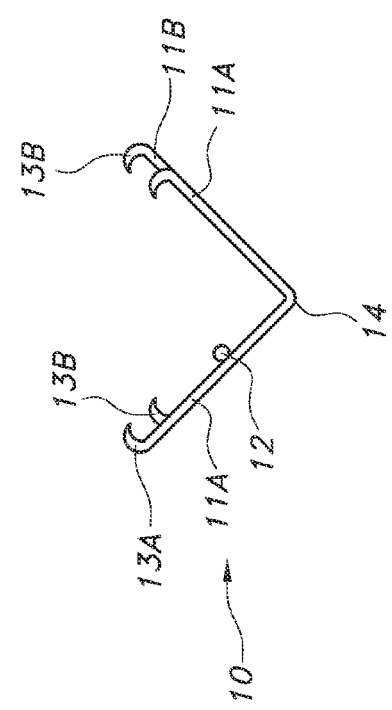
FIG. 3 is an end view of a conventional clipper closure (prior art).

FIGS. 3-4 illustrate individual components of the clipper closure assembly 100, which comprises a clipper closure 10, a wire mesh guard or reinforcement 20, a lock bar 30, and a protective coating 40. The clipper closure 10 is a conventional device that comprises a series of clips 11 held together on an assembly bar 12, also referred to as a "uni-bar." The series of clips 11 are bent to a V-shape, to facilitate assembly over the end of the fabric F. The V-point of the clip 11 forms an assembly loop 14, which is described below. Each clip 11 has two legs 15, with a barb 13 on each leg. The lengths of the two legs 15 differ, so that, relative to the assembly loop 14, there is a short leg 15A and a long leg 15B. FIG. 3 illustrates an end view of the clipper closure 10. A first clip 11A has barbs 13A and second clip 11B has barbs 13B. As can also be seen in FIG. 2, the clips 11 are assembled on the assembly bar 12, such that the series of clips 11 has an alternating series of short and long legs on each side of the clips.

Figure 5:
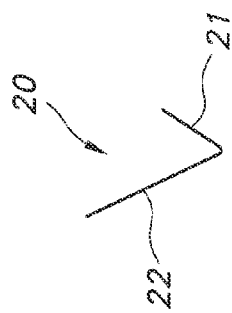
FIG. 5 is a cross-sectional view of a wire mesh guard.

FIG. 5 illustrates the profile of the wire mesh guard 20, having a short side 21 and a long side 22. The wire mesh material for the guard has a gauge that is dimensioned to receive a barb 13 in an open space in the mesh.

The wire mesh guard 20 is placed over an end of the fabric F and the clipper closure 10 placed over the wire mesh guard. A clamp or press is used to press the wire mesh guard 20 and the clipper closure 10 firmly against both sides of the fabric F. In so doing, the barbs 13 on one side of the clipper closure bite into the long side 22 of the wire mesh guard and the barbs on the other side bite directly into the fabric F, without biting into the wire mesh guard 20. FIG. 1 shows the wire mesh guard 20 and clipper closure 10 pressed into the fabric F. A protective coating 40 is applied over a portion of the clipper closure 10 and the wire mesh guard 20, leaving the assembly loop 14 clear of any protective coating As shown in FIG. 2, two ends of fabric F prepared with the clipper closure assembly 10 are brought together, such that the assembly loops 14 of one assembly fit in-between the assembly loops 14 of the second assembly. The lock bar 30 is now insertable through the series of loops 14, effectively locking the first clipper closure assembly with the second one. The ends of the lock bar 30 are bent, as shown in FIG. 2, or otherwise adapted to prevent the lock bar from inadvertently working its way out of the lock position.

It is understood that the embodiments described herein are merely illustrative of the present invention. Variations in the construction of the clipper closure assembly may be contemplated by one skilled in the art without limiting the intended scope of the invention herein disclosed and as defined by the following claims.

What is claimed is:

1. A clipper closure assembly for securing first and second ends of fabric, the assembly comprising:
  a first and a second clipper closure, each clipper closure comprising a series of clips alternatingly mounted on an assembly bar, each of the clips having a V-shape that includes a short leg and a long leg with a bend therebetween, wherein each leg has a leg end with a barb;
  a first and a second wire mesh guard, each folded in a V-shape and each having a short side and a long side; and
  a lock bar;
  wherein, to install the clipper closure assembly on the fabric, the first clipper closure is placeable over the first wire mesh guard and the second clipper closure over the second wire mesh guard, and wherein each clipper closure is pressed together about its respective wire mesh guard and its respective end of the fabric, thereby forcing the barbs on one side of the first clipper closure to bite into the first wire mesh guard and the first end of the fabric and the barbs on another side of the first clipper closure to bite only into the first end of the fabric, and forcing the barbs on one side of the second clipper closure to bite into the second wire mesh guard and the second end of the fabric and the barbs on another side of the second clipper closure to bite only into the second end of the fabric, each clipper closure fitting over its respective wire mesh guard so as to provide a first series and a second series of closure loops that extend beyond the respective end of the fabric; and
  wherein, when the first and second series of closure loops are brought together, the first series of closure loops aligns alternatingly with the second series of closure loops, so that the lock bar is insertable through the first and second series of closure loops, thereby securing the first end and second end of the fabric together.

2. The clipper closure assembly of claim 1, further comprising a protective coating that is applied to the first wire mesh guard and the legs of the first clipper closure after assembly on the first end of the fabric.

* * * * *